US005250769A

United States Patent [19]

Moore

[11] Patent Number: 5,250,769

[45] Date of Patent: Oct. 5, 1993

[54] ROADWAY TREADLE SWITCH ASSEMBLY

[76] Inventor: Curtis W. Moore, 976 Plouvier Rd., Hodgensville, Ky. 42748

[21] Appl. No.: 902,847

[22] Filed: Jun. 23, 1992

[51] Int. Cl.[5] ........................ G02B 6/26; H01H 13/16

[52] U.S. Cl. ................................ 200/86 R; 250/222.1; 340/665; 340/942; 385/13

[58] Field of Search ................ 307/119, 311; 340/652, 340/665, 666, 644, 942; 361/168.1, 179; 73/146; 377/9; 385/13, 32, 51; 200/86 R, 308; 250/221, 222.1, 222.2, 224

[56] References Cited

U.S. PATENT DOCUMENTS

| | | | |
|---|---|---|---|
| 2,885,508 | 5/1959 | Wilcox | 200/86 R |
| 3,818,162 | 6/1974 | Monroe | 200/86 R |
| 4,455,465 | 6/1984 | Habeger | 200/86 R |
| 4,488,040 | 12/1984 | Rowe | 250/227 |
| 5,056,884 | 10/1991 | Quinlan, Jr. | 385/13 |

*Primary Examiner*—Gerald P. Tolin

*Attorney, Agent, or Firm*—Maurice L. Miller, Jr.

[57] ABSTRACT

A treadle switch assembly for installation in a roadway bed for use in sensing vehicular traffic flow thereover is disclosed. The assembly includes at least one elongated treadle constructed of a compressible, resilient material which contains a hollow passageway throughout its length. Also included is a photocell emitter and a photocell collector, which elements are connected to opposite ends of the treadle and inserted into opposite ends of the passageway. When the treadle is compressed by a vehicle tire, the passageway is mashed closed to interrupt the radiation beam from the emitter to the collector, whereby the collector generates a signal indicative of the passage of the vehicle tire thereover, which signal may be used to operate a suitable counter or signal device as desired. The passageway may be formed with an oval or elliptical cross-section such that the minimum diameter of the cross-section extends in a vertical direction to enhance closure of the passageway to interrupt the radiation beam when the treadle is compressed. Opposite end portions of the treadle and the attached photocells are disposed in junction boxes embedded in the roadway, preferably, adjacent the traveled portions thereof. In the alternative, the emitter and collector may be of the single unit type which is disposed in one end of the treadle while a reflector is disposed at the other end.

14 Claims, 2 Drawing Sheets

FIG. 4
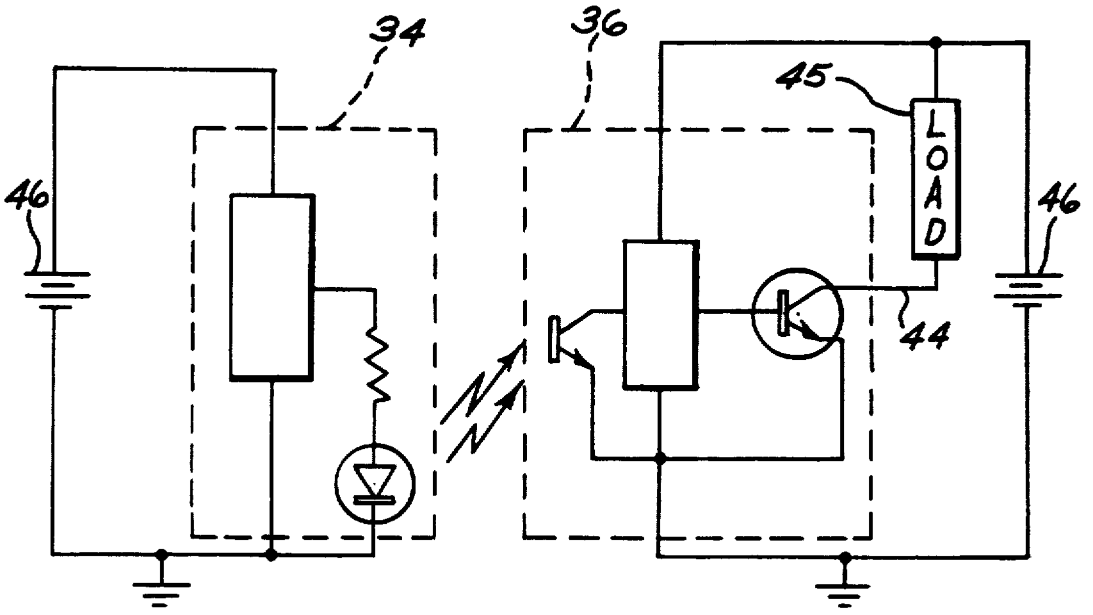
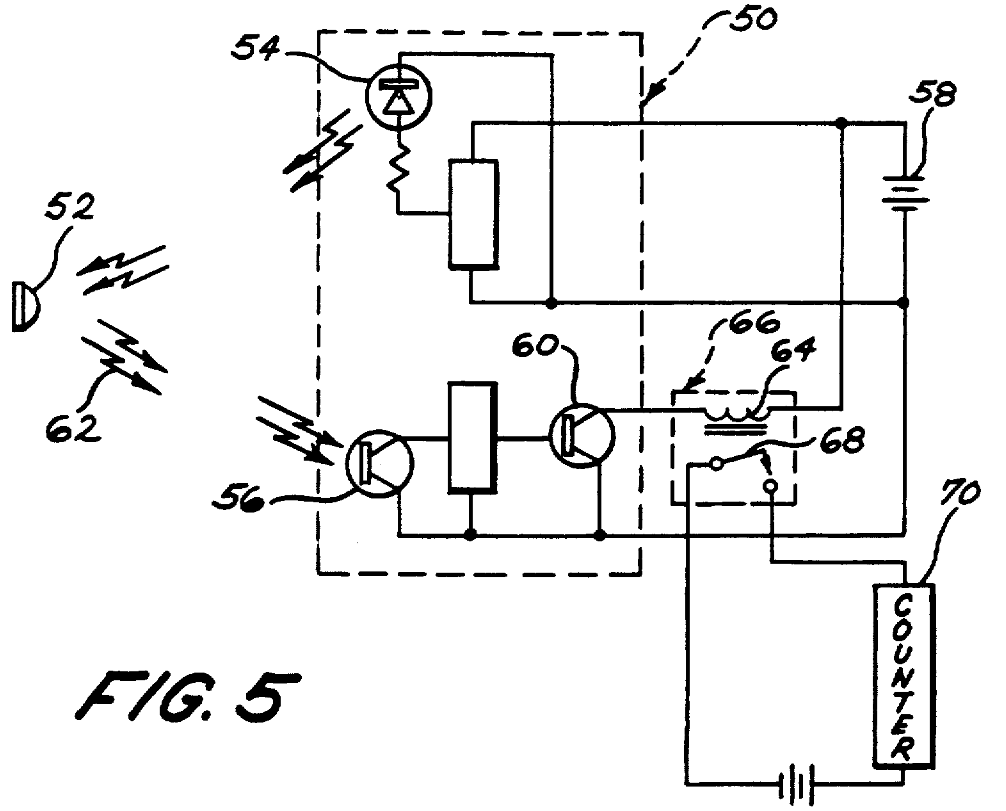
FIG. 5

ROADWAY TREADLE SWITCH ASSEMBLY

BACKGROUND OF THE INVENTION

This invention relates generally to a compressible treadle switch and assemblies containing the same which are installed in roadways for sensing vehicular traffic flow, for counting the number of axles on individual vehicles for toll assessment purposes, and the like. More specifically, the invention relates to such treadles which, when compressed, interrupt a light beam generated by an associated optical system to thereby operate a vehicle traffic counter and/or vehicle axle counter.

Broadly speaking, compressible treadles which are disposed in a rigid tray or frame buried in a surface portion of a highway and which operate, when compressed, to close the contacts of an electrical switch to actuate an electrical counter for counting the number of vehicles passing thereover and/or for counting the number of axles on individual vehicles, have long been known and used in the prior art. See, for example, the treadle assembly disclosed in U.S. Pat. No. 4,455,456 issued to D. Habeger on Jun. 19, 1984. The reference system includes a plurality of elongated treadles of generally trapezoidal cross-section which are formed of a compressible, resilient material such as natural or synthetic rubber, polymer plastic or the like. These treadles are disposed within a steel tray in parallel extending, spaced apart relationship. Elongated retaining bars mounted on base plates and affixed thereto with countersunk hex nuts are disposed between the treadles to retain the latter within tray.

The tray containing the aforesaid components is then mounted on a support frame and buried within a roadway so that the tires of vehicles passing along the roadway will roll across the exposed treadles and compress the same. Each treadle defines a longitudinally extending hollow passageway therethrough containing a pair of elongated metallic, electrical contact strips attached to upper and lower surfaces of the passageway. As the tires of a vehicle cross a given one of the treadles, the treadle material is vertically compressed, causing the strips on the upper and lower surfaces of the passageway to be pressed together to thus close an electrical circuit and operate a counter. The reference treadle assembly thus operates as an electrical switch to control a counter in response to a compression force applied to the treadle by a vehicle tire.

Another compressible treadle switch assembly for use in a roadway is disclosed in U.S. Pat. No. 2,885,508 issued to H. A. Wilcox on May 5, 1959. As in the previously mentioned patent, the instant treadle contains a longitudinally extending passageway having elongated, spaced apart electrical contact strips attached to upper and lower defining surfaces of the passageway. Vehicle tires rolling across the subject treadle compress the same to bring the strips into contact with one another to actuate an electrical counting circuit.

Care must be exercised in the shipping and handling of these prior art treadles so as not to bend them and thus permanently deform and mechanically short circuit the contact strips. Because of this problem, it is wise to securely pack such treadles in rigid crates for shipping purposes. It is also essential that the open ends of the passageways of such treadles be carefully sealed to prevent the introduction of excessive moisture therein which could cause the electrical contact strips to short circuit. It is difficult to obtain an effective moisture seal in most cases, by reason of which these prior art treadles tend to permanently short out between the terminal strips after a relatively short period of use. On the average, such treadles must be replaced after only about six months of use due to excessive moisture in the passageway which has produced a permanent shorting of the contact strips. Finally, because of the care required in the handling of such treadles prior to and during installation so as to avoid permanently bending the contact strips, a great deal of time must be taken in order to carefully install them.

By means of my invention, these and other difficulties encountered using prior art treadles and assemblies containing the same are substantially overcome.

SUMMARY OF THE INVENTION

It is an object of my invention to provide a roadway treadle switch assembly which operates in conjunction with a radiation emitter and collector to sense vehicular traffic flow and to sense the number of axles of an individual vehicle, such as a truck or trailer, for toll assessment purposes.

It is a further object of my invention to provide an improved roadway treadle switch assembly which employs treadles which will not be damaged by the type of bending that occurs during ordinary handling, that utilizes a relatively light weight treadle easily carried by a single worker, and that is not susceptible to electrical short circuiting and permanent damage caused by the presence of excessive moisture in the treadle passageway.

Briefly, in accordance with my invention, there is provided a roadway treadle switch assembly which includes a treadle constructed of a compressible, resilient material defining a hollow passageway terminating at openings located on opposite ends thereof. The treadle is adapted for disposition in a surface portion of a roadway such that a vehicle tire passing thereover will compress the same to effectively close a portion of the passageway. Means connected to the treadle for transmitting a light beam through the passageway is also included. Also included is means connected to the treadle for receiving the light beam as transmitted through the passageway by the transmitting means and for generating an output signal upon interruption of the light beam, indicative of the passage of a vehicle tire across the treadle.

These and other objects, features and advantages of my invention will become apparent to those skilled in the art from the following detailed description and attached drawings upon which, by way of example, only a preferred embodiment of my invention is illustrated.

BRIEF DESCRIPTION OF THE DRAWINGS

FIG. 4 shows an electrical schematic diagram of a photocell system which can be used in the treadle switch assembly of FIGS. 1-3.

FIG. 5 shows an electrical schematic diagram for an alternate photocell system which can be used with the treadle switch assembly of FIGS. 1-3.

DESCRIPTION OF THE PREFERRED EMBODIMENT

Figure 1:
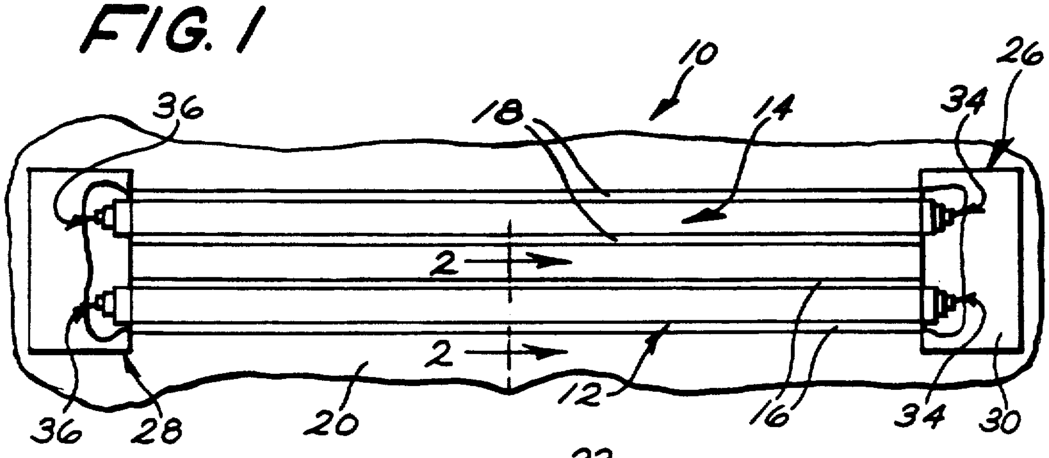
FIG. 1 shows a top plan view of a dual treadle, photocell activated switch assembly disposed in a highway near a toll plaza for operating a traffic flow or axle counter, thus illustrating a preferred embodiment of my invention.

Referring now to the drawing figures there is shown, in one preferred embodiment of my invention, a roadway treadle switch assembly 10 containing a pair of spaced apart, parallel extending treadles 12 and 14 disposed in a pair of elongated, rigid metal trays or channels 16 and 18, respectively. The treadles 12 and 14 are constructed of any suitable compressible, resilient material such as, for example, natural or synthetic rubber. The channels 16 and 18 are identical in construction and are disposed in a surface portion 20 of a concrete or asphalt roadway such that an upper surface portion 22 of each of the treadles 12 and 14 is essentially flush with the traveled surface of the roadway as shown more clearly in FIG. 2.

Figure 2:
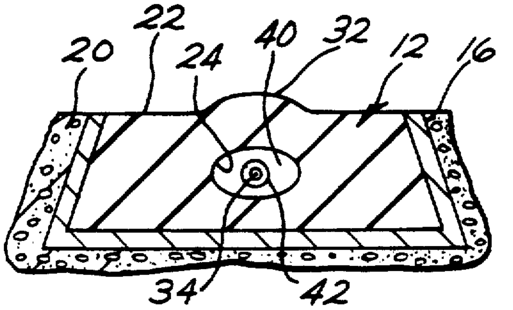
FIG. 2 shows a cross sectional elevation view of one of the treadles of the assembly of FIG. 1 as viewed along cross-section lines 2—2 of the latter mentioned figure.
Figure 3:
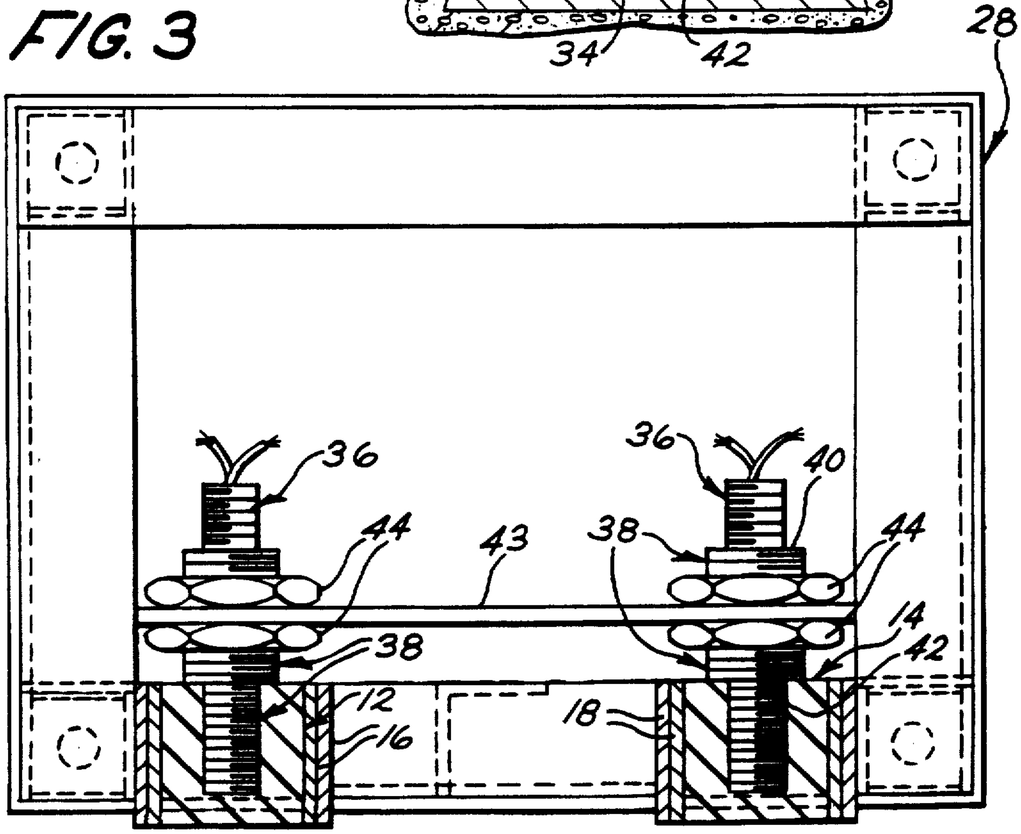
FIG. 3 shows a plan view of one of two junction boxes which are located at opposite ends of the treadles of the switch assembly of FIG. 1, an upper cover of which is removed to permit viewing of the interior.

Each of the treadles 12 and 14 contain a hollow, longitudinally extending passageway 24 which opens onto opposite ends of the former. A pair of junction boxes 26 and 28 are joined to opposite ends of the treadles 12 and 14 and are likewise buried in a surface portion of the roadway, preferably adjacent the traveled portion thereof. The junction boxes 26 and 28 are of identical construction and are provided with a removable cover plate 30, the outer surface of which is exposed and essentially flush with the roadway surface to permit access to the interior thereof as desired. As shown in FIG. 2, the passageway 24 in each of the treadles 12 and 14 is generally oval shaped in cross-section such that its minimum diameter extends in a vertical direction. Each passageway 24 is aligned vertically under a raised elongated rib 32 formed on the upper treadle surface 22. Thus, the rib 32 is slightly above the level of the roadway such that a vehicle tire rolling across the same will readily compress the material in the treadles 12 and 14 to, in turn, momentarily close a portion of the passageways 24.

The assembly 10 includes a light beam transmitting means or radiation emitter 34 and a light beam receiving means or radiation collector 36 which are disposed in opposite ones of the junction boxes 26 and 28, respectively, and which are partially inserted within hollow tubular adapters 38, the latter being partially inserted within opposite open ends of the passageways 24. The adapters 38 each contain a relatively large outside diameter segment 40 and a relatively small outside diameter segment 42. The segment 42 is sized to friction fit securely within an end portion of the passageway 24 and is exteriorly threaded to enhance its gripping action. The outer diameter segment 40 is sized to completely cover the end of the oval shaped passageway 24 in which the corresponding segment 42 is inserted so as to prevent light from entering the passageway 24 around the outside surface of the adapter 38. The segment 40 is inserted through a circular opening in a plate 43 and is fastened thereto by means of a pair of nuts 44. The plate 43 is attached to the sidewalls of each of the junction boxes 28 and 30, whereby the emitters 34 and collectors 36 are secured in their alignment in the passageways 24.

The emitter 34 in one end of each of the treadles 12 and 14 directs a collimated beam of electromagnetic radiation, preferably either visible or infrared light, along its corresponding passageway 24 and onto the opposing collector 36 located in the opposite end of the corresponding treadle. Now when a vehicle tire rolls across one of the ribs 32, the corresponding treadle 12 or 14 is compressed which, in turn, compresses and effectively closes the corresponding oval passageway 24 to interrupt the beam of radiation directed by one of the emitters 34 onto its corresponding opposing collector 36. Interruption of the beam causes a d.c. voltage to be generated at output terminal 44 (FIG. 4) to operate a conventional relay 45 which, in turn, operates a conventional counter of any suitable type to count the passage of a vehicle over the treadle or the passage of an axle of a vehicle thereover, as the case may be.

The emitters 34 and collectors 36 which I recommend for use in this assembly are the CP18 series photoelectric controls of the "thru-scan" type as manufactured by the Micro Switch Division of Honeywell, Inc., 11 West Spring Street, Freeport, Ill. 61032. Specifically, the emitters 34 are each Micro Switch No. CP18EDX2 and the collectors 36 are each dark operated Micro Switch No. CP18RDND2. These types of emitters and collectors can be powered from a suitable 20 to 24 volt d.c. power source as at 46 in FIG. 2. The treadles 12 and 14 may be of any suitable length to span the desired roadway lane width and can be obtained from Sur-Seal Gasket and Packing, Inc., 6156 Wesselman Road, Cincinnati, Ohio 45248. The treadles I recommend have a base width of $1\frac{3}{4}$ inches, an upper surface width of $1\frac{5}{8}$ inches, a height of $\frac{3}{4}$ inch (not including the height of the raised rib 32, which is an additional $\frac{1}{4}$ inch in height). The oval shaped passageway 24 is aligned under the rib 32 a distance of $\frac{1}{4}$ inch above the base and, in an uncompressed state, has a maximum horizontal width of 11/16 inch, and a maximum vertical height of 5/16 inch.

In actual operation of the treadle switch assembly of this example, I have found that moisture in the passageway presents no apparent problem. In fact, I have found that the photocells will operate even when the passageways are completely filled with water. Moreover, because there are no delicate rigid metallic contact strips disposed in the passageway of my treadle, the treadle may be allowed to bend and flex during shipping, handling and installation without causing damage thereto. And because moisture in the passageway presents no major problem, I expect the operating life of the treadle used with my assembly to be greatly increased over that of treadles of the prior art which employ metallic contact strips in their passageways.

Referring now to FIGS. 1-3 and 5 and, in particularly, to the latter figure, an alternative arrangement for the photocell system of my invention is disclosed which utilizes a composite photo emitter and detector 50 located at one end of the treadle 14 and/or 16 and a reflecting mirror or reflector 52 located at the opposite end. The circuit 50 is representative of the Honeywell Microswitch CP18LAAD2 series which includes both a light transmitting means or emitter 54 and a light receiving means or collector 56 in a single housing. The circuit shown within the dashed box 50 is the standard circuit diagram for this publicly available composite device. The reflector 52 of the present example may be that manufactured by Honeywell under manufacturers No. FERR4 and may be directly inserted into one end of the passageway 24 of the treadles 14 and 16 of FIGS.

1-2. A suitable d.c. power source 58 of 20 to 24 volts d.c. powers both the emitter 54 and collector 56. A transistor 60 within the composite emitter/collector unit 50 produces an electrical output signal upon interruption of a reflected light beam 62 being returned to the detector 56 from the reflector 52 through the treadle passage 24 (See FIG. 2). The output signal thus produced energizes a coil 64 of a relay 66 to close a relay switch 68 to operate a suitable counter 70.

The composite photocell unit of the present example requires that the reflector 52 not be located more than about four feet from the emitter/collector unit 50 which is a drawback not shared with the separate emitter 34 and collector 36 thru scan arrangement of the previous example. Accordingly, a suitable roadway guide means may be required when using the composite unit 50 of this example to guide the tire of a passing vehicle over a treadle whose length does not exceed about four feet. Otherwise, use of this example of the invention upon roadways of standard width could result in vehicle tires passing to one side or the other of the treadle, whereby the counter 70 would not be actuated. But, in any case, the system of FIG. 5 would be useful in special circumstances where the counting of slow moving vehicles is needed.

Although the present invention has been described with respect to specific details of a certain preferred embodiment thereof, it is not intended that such details limit the scope or coverage of this patent other than as specifically set forth in the following claims.

I claim:

1. A roadway treadle switch assembly comprising a treadle constructed of a compressible, resilient material defining a hollow passageway terminating at openings located on opposite ends thereof, said treadle being adapted for disposition in a surface portion of a roadway such that a vehicle tire passing thereover will compress the same to effectively close a portion of said passageway, means located at one end of said treadle for transmitting a light beam through said hollow passageway, and means located at the other end of said treadle for receiving said light beam as transmitted through said hellow passageway by said transmitting means, and for generating an output signal upon interruption of said light beam caused by a compression of said treadle and an effective closure of a portion of said passageway, indicative of the passage of a vehicle tire across said treadle, a portion of passageway located between said transmitting and receiving means being free of solid objects.

2. The assembly of claim 1 further comprising a rigid metal tray having two sides and a base, said treadle being disposed in said tray in relatively close fitting relationship.

3. The assembly of claim 1 further comprising a first junction box connected to one end of said treadle and containing said transmitting means, and a second junction box connected to the other end of said treadle and containing said receiving means.

4. The assembly of claim 1 wherein said transmitting and receiving means comprise an infrared light emitting diode and an infrared light receiving photodetector respectively.

5. The assembly of claim 1 wherein said passageway is elliptical in cross-section taken perpendicular to its length, the shortest diameter of said elliptical cross-section being normal to the base of said treadle to facilitate restriction of said passageway to interrupt reception of said light beam by said receiving means upon compression of said treadle caused by a vehicle tire passing thereover.

6. The assembly of claim 3 further comprising a pair of hollow tubular adapters, one of said pair being partially inserted into one end of said passageway and the other one of said pair being partially inserted into the other end of said passageway, said transmitting means being threadably secured in an outer end portion of one of said pair and said receiving means being threadably inserted into the other one of said pair.

7. The assembly of claim 6 wherein each of said adapters comprises a relatively small diameter portion adapted for insertion into an open end of said passageway, and a relatively larger diameter portion attached to an outer end of said small diameter portion and disposed outside of said passageway, said transmitting and receiving means each being threadably inserted into said larger diameter portion of a different one of said pair.

8. The assembly of claim 1 wherein said transmitting means comprises a visible light emitting diode and said receiving means comprises a visible light receiving photodetector.

9. A roadway treadle switch assembly comprising a treadle constructed of a compressible, resilient material defining a hollow passageway terminating at openings located on opposite ends thereof, said treadle being adapted for disposition in a surface portion of a roadway such that a vehicle tire passing thereover will compress the same to effectively close a portion of said passageway, means located at one end of said treadle for transmitting a light beam in one direction through said hollow passageway, for receiving a portion of said light beam as reflected in the opposite direction from the other end of and through said passageway, and for generating an output signal upon interruption of said light beam caused by a compression of said treadle and an effective closure of a portion of said passageway, indicative of the passage of a vehicle tire across said treadle, a portion of said passageway located between said transmitting and receiving means, located at one end of said treadle, and reflecting means, located at the other end of said treadle, being free of any solid elements, said reflecting means located at the other end of said treadle for reflecting said light beam back through said passageway toward said transmitting and receiving means.

10. The assembly of claim 9 further comprising a rigid metal tray having two sides and a base, said treadle being disposed in said tray in relatively close fitting relationship.

11. The assembly of claim 9 further comprising a junction box connected to one end of said treadle and containing said transmitting and receiving means.

12. The assembly of claim 9 wherein said transmitting and receiving means comprises an infrared light emitting diode and an infrared light receiving photodetector.

13. The assembly of claim 9 wherein said transmitting and receiving means comprises a visible light emitting diode and a visible light receiving photodetector.

14. The assembly of claim 9 wherein said passageway is elliptical in cross-section taken perpendicular to its length, the shortest diameter of said elliptical cross-section being normal to the base of said treadle to facilitate restriction of said passageway to interrupt reception of said light beam by said transmitting and receiving means upon compression of said treadle.

* * * * *

UNITED STATES PATENT AND TRADEMARK OFFICE

CERTIFICATE OF CORRECTION

PATENT NO. : 5,250,769

DATED : October 5, 1993

INVENTOR(S) : Curtis W. Moore

It is certified that error appears in the above-indentified patent and that said Letters Patent is hereby corrected as shown below:

Col. 5, line 45, claim 1, "hellow" should read --hollow--

Signed and Sealed this

Sixteenth Day of May, 1995

Attest:

BRUCE LEHMAN

*Attesting Officer*

*Commissioner of Patents and Trademarks*